Figure 1:
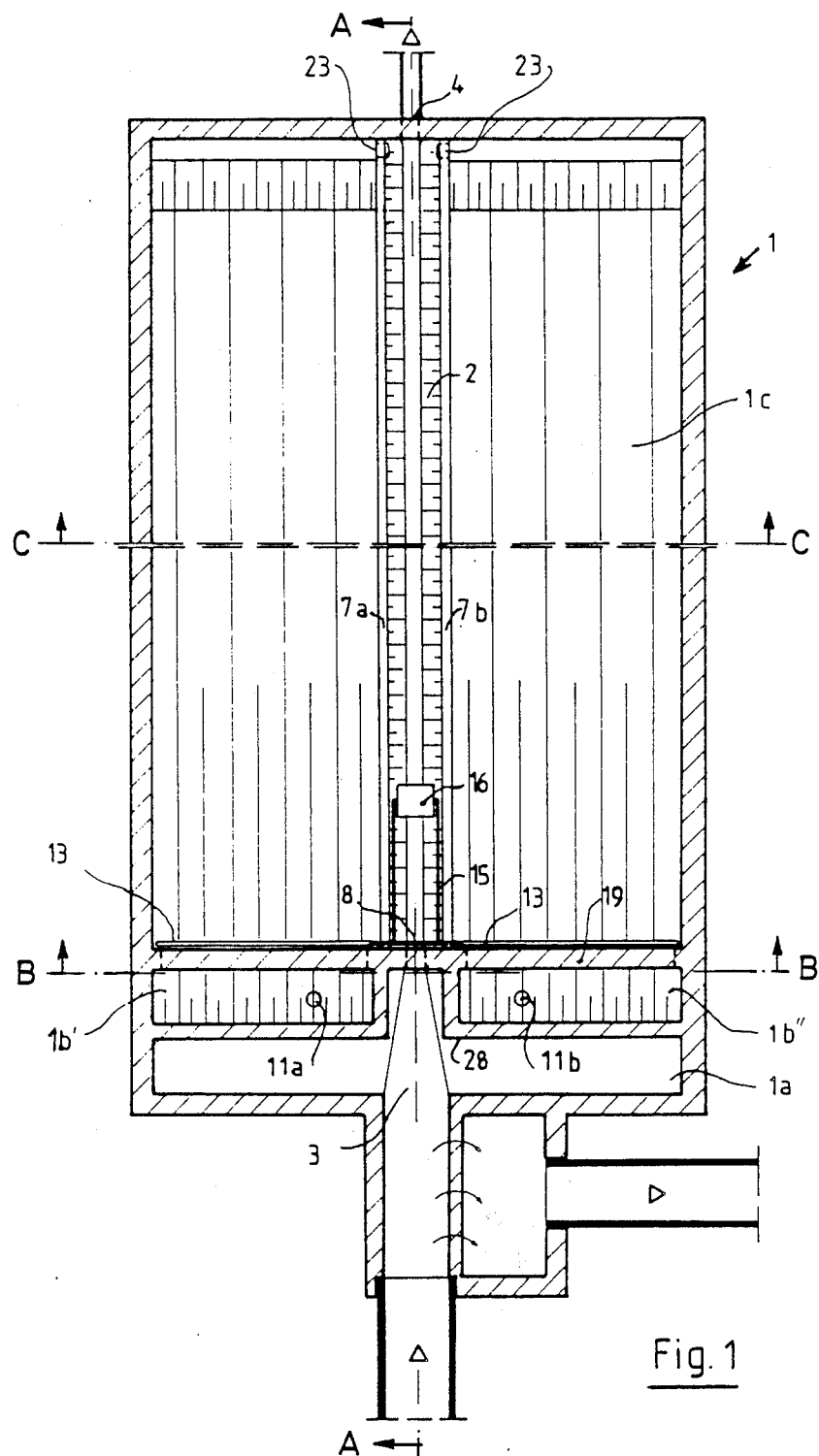

United States Patent [19]

Giehl et al.

[11] Patent Number: 4,800,907

[45] Date of Patent: Jan. 31, 1989

[54] STORAGE SPACE FOR LIQUIDS, WITH A FLUSHING DEVICE

[76] Inventors: K. Ulrich Giehl, Lindenstrasse 26, D-5239 Heimborn; Lothar Steinhardt, Panoramastrasse 44, D-6204 Taunusstein 2, both of Fed. Rep. of Germany

[21] Appl. No.: 912,100

[22] PCT Filed: Jan. 31, 1986

[86] PCT No.: PCT/EP86/00047

§ 371 Date: Sep. 22, 1986

§ 102(e) Date: Sep. 22, 1986

[87] PCT Pub. No.: WO86/04629

PCT Pub. Date: Aug. 14, 1986

[30] Foreign Application Priority Data

Feb. 2, 1985 [DE] Fed. Rep. of Germany ....... 3503509
Jul. 18, 1985 [DE] Fed. Rep. of Germany ....... 3525667

[51] Int. Cl.$^4$ .............................................. B08B 3/04
[52] U.S. Cl. ................................ 134/166 R; 134/182; 210/164; 210/98; 210/128; 210/534; 137/397; 405/43
[58] Field of Search .............. 134/56 R, 104, 109, 134/150, 155, 166 R, 182; 137/448, 397; 210/170, 128, 172, 534, 98, 134, 135; 405/78, 87, 100, 101

[56] References Cited

U.S. PATENT DOCUMENTS

| | | | |
|---|---|---|---|
| 4,136,010 | 1/1979 | Pilie et al. | 210/164 |
| 4,144,170 | 3/1979 | Dunkers | 210/212.2 |
| 4,225,434 | 9/1980 | Ernst et al. | 210/170 |

Primary Examiner—Harvey C. Hornsby
Assistant Examiner—Frankie L. Stinson
Attorney, Agent, or Firm—Max Fogiel

[57] ABSTRACT

The invention concerns a storage space for liquids, especially a rain-basin or sewer-backup space, with at least one flushing chamber that is positioned at the maximum height of the bottom of the storage space, that can be filled with storage liquid, and that emits the storage liquid in the form of a torrent of flushing water through at least one flushing opening when the storage space empties.

The object of the invention is accordingly a storage space for liquids with a flushing device wherein the storage space fills automatically and wherein the flushing process is automatically initiated subsequent to each storage process without outside energy.

This object is attained in that the flushing chamber automatically fills with storage liquid as the level of storage liquid rises, means of retaining the storage liquid in the flushing chamber once it has arrived therein are provided, and the flushing opening is closed off and opened up by a closure controlled by the level of storage liquid in the storage space.

16 Claims, 13 Drawing Sheets

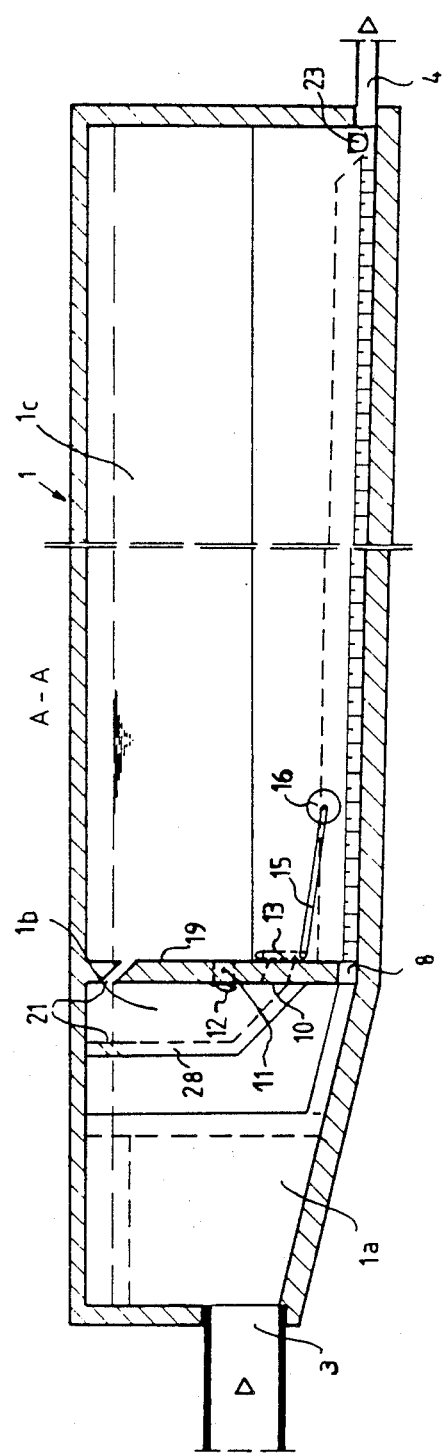

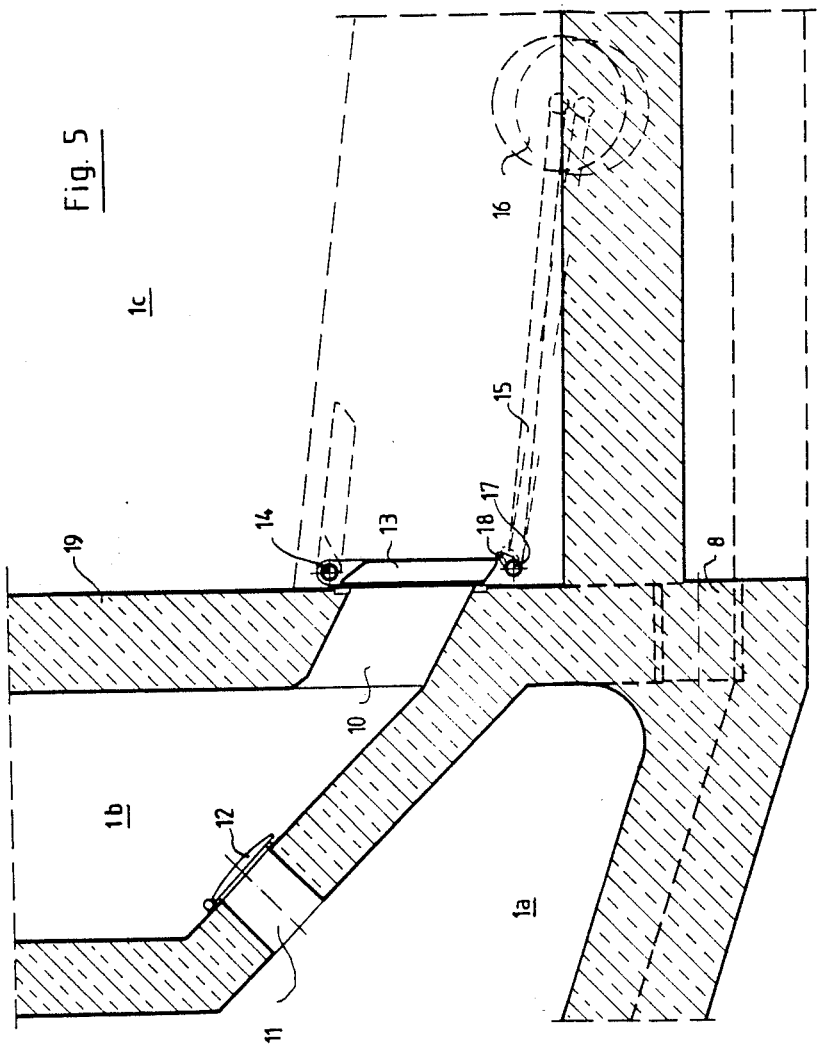

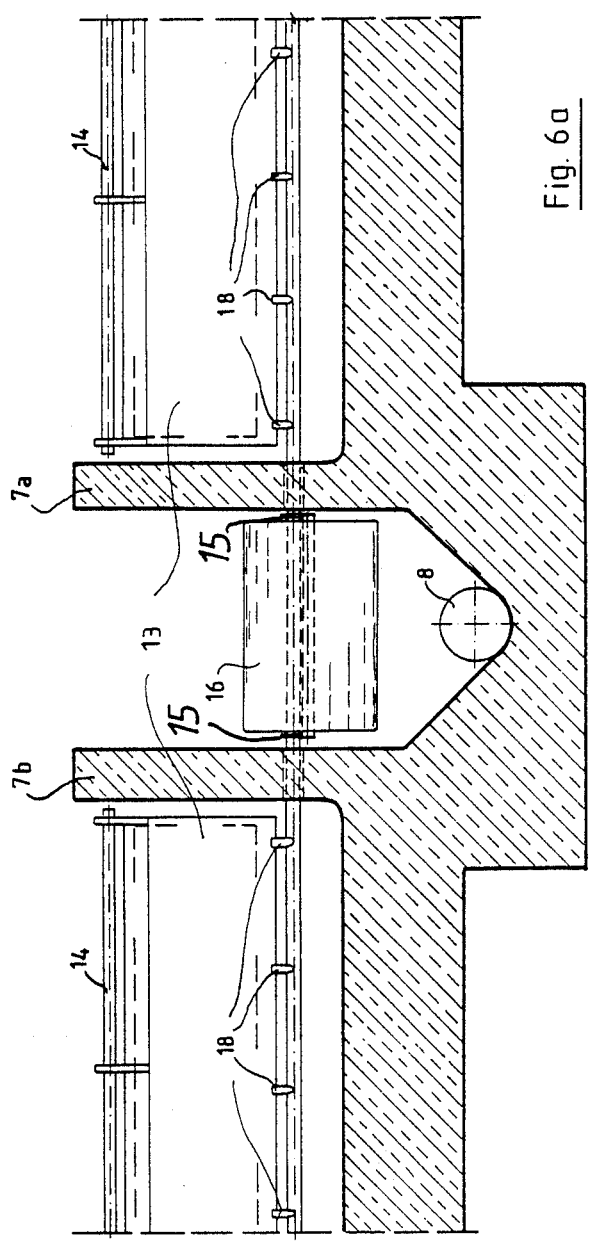

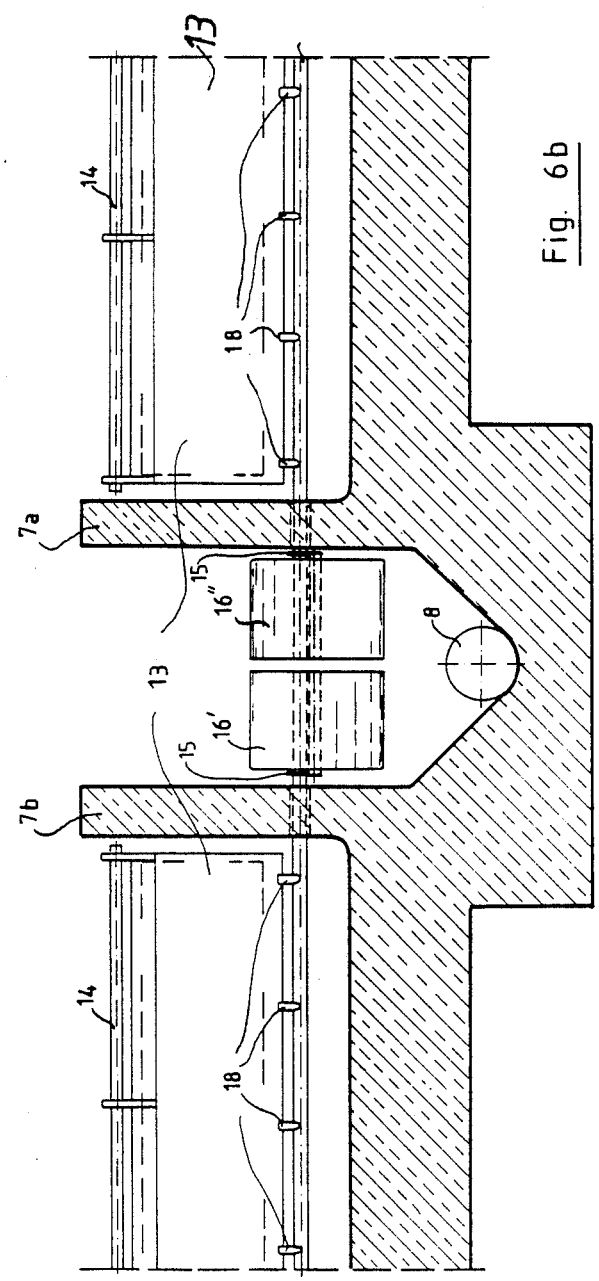

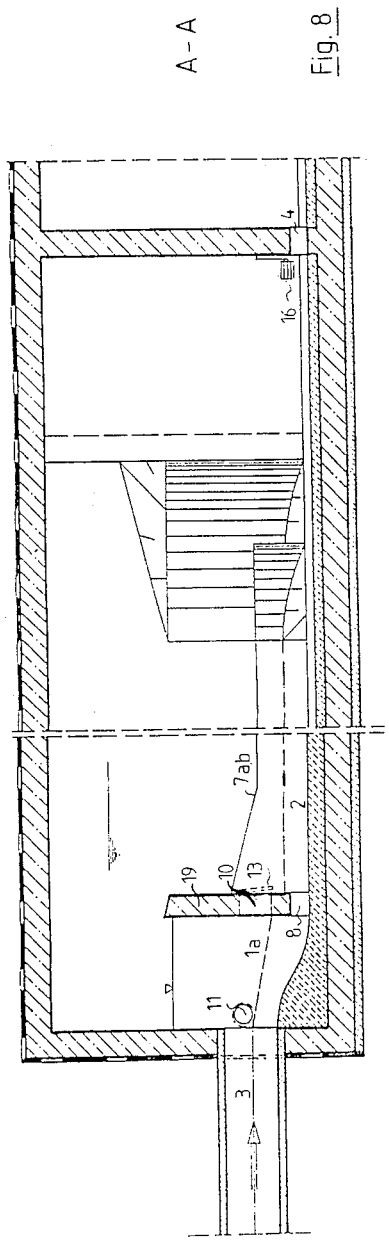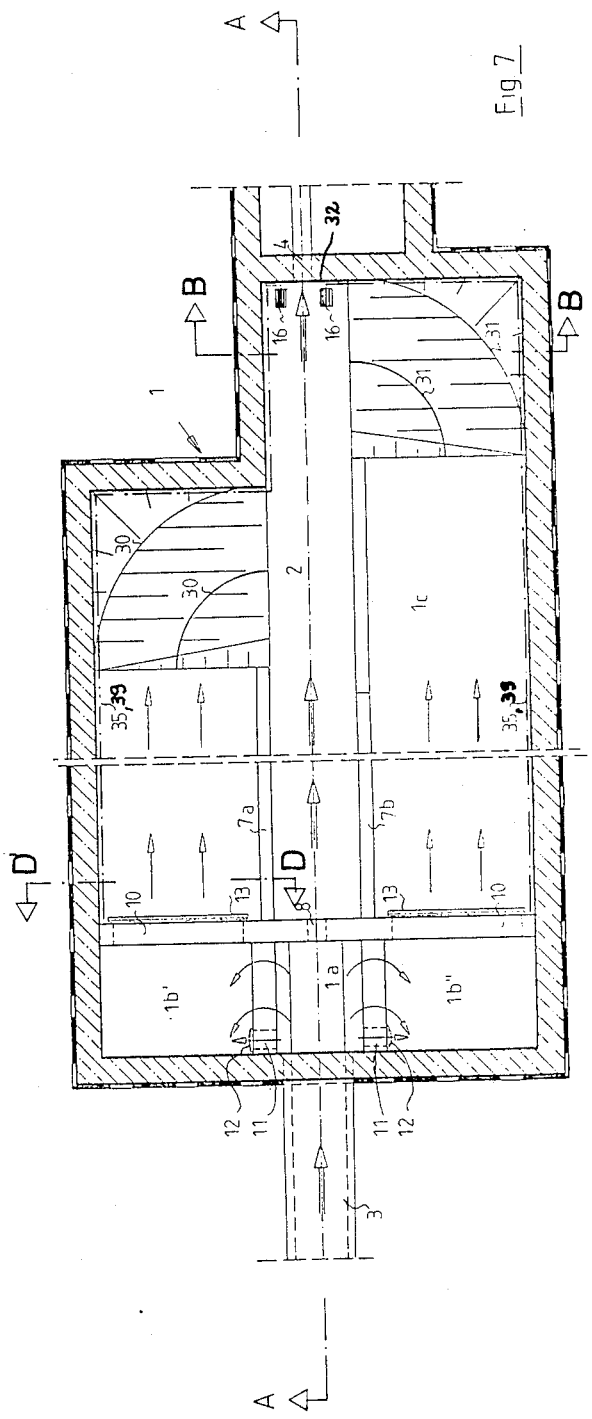

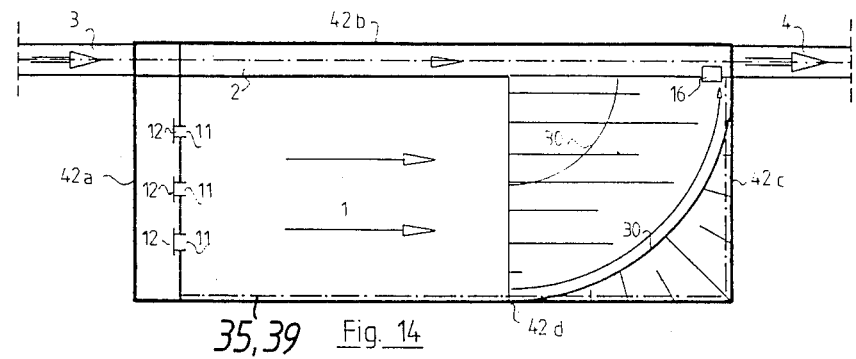
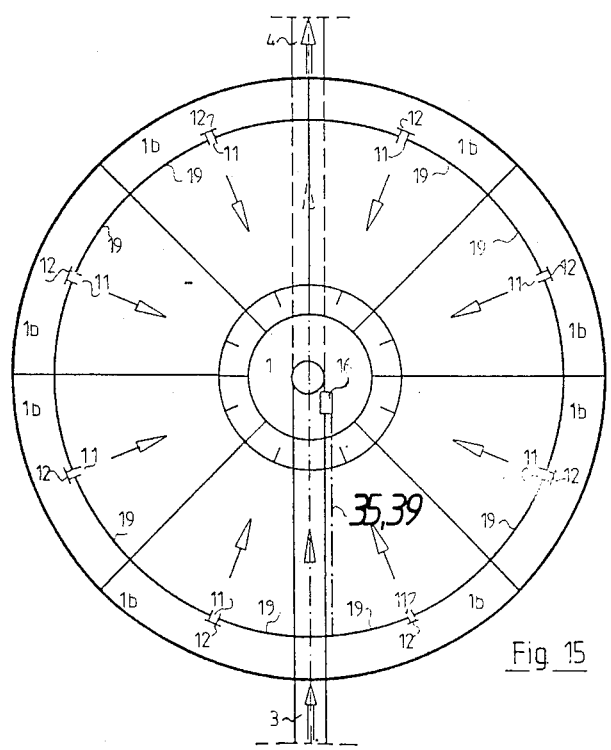

STORAGE SPACE FOR LIQUIDS, WITH A FLUSHING DEVICE

The invention concerns a storage space for liquids, especially a rain-basin or sewer-backup space, with at least one flushing chamber that is positioned at the maximum height of the bottom of the storage space, that can be filled with storage liquid, and that emits the storage liquid in the form of a torrent of flushing water through at least one flushing opening when the storage space empties.

Storage spaces for liquids are employed wherever suddenly occurring large volumes of liquid have to be accommodated and returned to the system subsequent to a delay to prevent undue stress on downstream equipment.

Liquid-storage spaces of this type are frequently employed as rainwater-retention basins, rainwater-clarification basins, rainwater-overflow basins, and backup canals for effluent disposal.

When rainfall is heavy and long-lasting, large volumes of rainwater or of mixtures of waters of different provenances suddenly occur, exceeding the capacities of the sewer mains and treatment plants by a multiple factor. These sudden expansions are accommodated by means of temporary storage in and returned to the system subsequent to a delay in rain basins or sewer-backup spaces for example and returned to the system subsequent to a delay.

The large volumes of water that occur in the storage spaces are accompanied precisely at the commencement of the precipitation situation by a considerable load of contamination because the contaminants deposited in the sewage system become entrained by the initial sudden increase in rainwater.

Most of the contamination settles to the bottom while the liquid is being stored and creates sludge that must be eliminated through the runoff when the storage spaces are emptied. Since, however, the outflow in the storage space is too weak and the associated sweeping force of the water insufficient to transport the deposits, most of the bottom sludge remains once the storage space has emptied. Thus, rain basins are equipped with scrapers or sprays to clean the bottom, although they are considerably expensive to install and involve the application of external power.

The use of a flushing table positioned above the bottom in the vicinity of the intake and extending across the basin is known from Swiss Pat. No. 590 980. The flushing table is filled with water from above and can be pivoted 90° around its axis. Its center of gravity when empty or partly full does not coincide with its center of gravity when full. The axis can be positioned between the two centers of gravity at a point that will prevent imbalance until the filling process has been completed, at which time the table will tilt, generating a flushing torrent against the wall of the basin. The water flows down along the wall, over a curved transition between the wall and the bottom of the basin, and then at high speed along the bottom, removing the deposited contamination and conveying it to the basin outlet. The emptied flushing table will then pivot back automatically into its horizontal position, and the process can be repeated.

The known flushing table has several drawbacks.

a. It necessitates a complicated water-level detector to trigger the filling process once the basin has completely emptied. Extensive mechanisms and controls are necessary along with their associated electric connections.

b. Since the capacity of the flushing table is limited by mechanical considerations, two or three flushing processes per flush are necessary.

c. Supply lines for filling up the flushing table are necessary, increasing the overall cost of the basin.

d. The flushing table is filled with either potable-quality water, which makes for very high operating costs, with mixtures of waters of different provenances, or with groundwater. Additional pumps with their associated electric controls are then needed of course to raise the water to the level of the flushing table from the bottom of the basin.

Storage basins with the bottom broken up in the form of humps and grooves and with flushing chambers that can be filled when necessary with clean water or effluent at the maximum height of the bottom of the basin are also known. Slide gates can be opened to flush out the grooves and hence the bottom of the basin.

This embodiment also has drawbacks:

a. The flushing chambers are filled like the aforesaid flushing tables.

b. The slide gates have to be opened electrically because the operation cannot be accomplished rapidly enough manually.

c. Since sliding closures cannot be opened suddenly, a torrent of water with optimal flushing action cannot be attained.

d. Since only a few grooves can be flushed out simultaneously by one slide gate, a large number of flushing chambers, slide gates, motors, controls, etc. are necessary, making the equipment considerably expensive.

e. Experience has shown that, when the aforesaid flushing chambers are operated manually, flushing will not occur after every rain, and the bottom sludge will solidify and be difficult to remove.

The object of the invention is accordingly a storage space for liquids with a flushing device that will avoid the aforesaid drawbacks and automatically initiate the flushing process subsequent to each storage process.

This object is attained by means of a liquid-storage space wherein the flushing chamber automatically fills with storage liquid as the level of storage liquid rises, means of retaining the storage liquid in the flushing chamber once it has arrived therein are provided, and the flushing opening is closed off and opened up by a closure controlled by the level of storage liquid in the storage space.

The advantage of the liquid-storage space in accordance with the invention is that the flushing chamber is automatically filled without external power at the commencement of the storage process and that the storage space is flushed with a powerful torrent of water once the storage space has emptied. Since all the flushing operations are carried out with accumulated storage liquid, there are no operating costs.

To ensure that the flushing chamber will be full enough to carry out complete flushing even in conjunction with light rains when the storage space does not become completely full, one embodiment of the invention has a choking opening positioned in a partition that separates a vestibule from the storage space. When it rains, the incoming water is backed up in the vestibule due to the choking opening. The backing up fills up the flushing chamber first without the main chamber having to be filled up. The choking opening also flushes out the dry-weather gutter and rinses old deposits away. A choking opening, however, is basically unnecessary in that flushing in sewer storage spaces with a small and narrow intake construction and a low emergency runoff is also conceivable.

The intake opening into the flushing chamber can communicate with the vestibule, with the main chamber, or with the vestibule and storage space and is closed of by means of a flap trap. There can also be additional intake openings to allow the water or liquid to flow into the flushing chamber from either the vestibule or main chamber.

The outlet from the flushing chamber consists of a flushing opening that can be closed off. It can be closed off by means of a closure flap mounted to rotate on a shaft above the flushing opening.

The closure flap can be closed for example by a mechanism consisting of a shaft that rotates in the main chamber and below the flushing opening, that is displaced from the level of the liquid in the runoff area by means of a float, and that has cams or hooks rigidly secured to it in such a way that they force the closure flap tight against the flushing opening when the float ascends and suddenly release it when the float descends.

As soon as the liquid backs up in the storage space, the float ascends and closes of the flushing opening in the flushing chamber by means of cams for example. Liquid will simultaneously back up in the vestibule and flow for example into the flushing chamber through the intake opening. The intake opening is by definition higher than the choke(s), so that coarse contaminants that get transported to the bottom because of their weight will flow out through the choke and will not get into the flushing chamber.

When, now, the level of the liquid drops again, the liquid will be retained by a means of a closure, specifically by a sort of flap trap at the intake opening, and the flushing chamber will remain full. When the storage space has emptied, the float will have descended until for example the cams release the closure flap at the flushing opening. The flap will be forced up by the accumulated liquid in the flushing chamber, and a flushing torrent will gush into the storage space.

Since the flushing opening of the flushing chamber is only slightly higher than the bottom of the basin, there is no loss of energy when the accumulated water exits, as occurs for example in the case of a flushing table due to the diversion of the flushing torrent. Since the storage volume is unlimited in terms of mechanical engineering in accordance with the invention, the volumes of flushing liquid will be greater at lower damming or falling levels.

The sudden opening of the flushing opening in the flushing chamber is facilitated in that the closure flap is a floating body and can accordingly float up.

The wall between the vestibule and the flushing chamber and/or the wall between the flushing chamber and the storage space can be in the form of overflow sills. Since, when there is a choking opening, the maximum intake volume can absolutely not flow completely into the storage space through the choking opening, the excess will be able to arrive in the storage space through the overflow sill.

Since, due to the choke, the liquid will initially dam up in the vestibule, the liquid will at first flow over the wall of the flushing chamber. To retain floating contaminants, the wall can extend above the maximum liquid level and be provided with slots that slope toward the flushing chamber and provide a downflow-baffle action, or else a downflow baffle can be positioned upstream of the wall and extending into the vestibule.

The base of the liquid-storage space in one embodiment of the invention is rectangular. Several flushing chambers can be positioned adjacent to one another, preferably on the right and on the left in the vicinity of the maximum height of the bottom or in that of the intake. The flushing openings of these flushing chambers can be closed off by means of a mechanism that can be activated by a single float. To prevent excessive strain on the outlet area of the liquid-storage space during flushing, each flushing opening in another embodiment of the invention is provided with a separate closure mechanism, each activated by a separate float, whereby the floats can be positioned in such a way that the flushing chambers will empty one after another.

Flushing chambers can also be positioned next to one another and/or one above another and/or one behind another, with several being controlled by one float.

It is practical for the storage space to have a runoff gutter that parallels the direction the storage liquid runs out in, whereby channeling sections are positioned parallel to it and at its edge to channel the flushing torrent. The channeling sections will preferably not extend above the maximum level of the liquid. In storage spaces with transversely sloping bottoms it is practical to position additional channeling sections along the basin to channel the flushing torent. These channeling sections will preferably converge slightly along the basin and toward the runoff gutter to ensure that the outlet area will also get effectively flushed.

The base of the liquid-storage space in another embodiment of the invention is circular or polygonal. The main chambers in a liquid-storage space of this type constitute an external circular-ring segment separated from the vestibule by a flat partition section, by a circular partition section or baffle, and by another flat partition section. The float in this embodiment is positioned, as in the embodiment with the rectangular base, in the vicinity of the outlet.

As previously mentioned herein, an optimum flushing action is attained in accordance with the invention in that the flushing chamber or chambers is or are positioned in the vicinity of the maximum height of the bottom of the basin.

The maximum height of the bottom of the basin is to be understood herein as the highest point on the bottom surface of the storage space, the bottom of the basin for example. If the runoff gutter in a basin with a runoff gutter is to be flushed separately, generally once the basin as a whole has been flushed out, one embodiment of the invention has at least one flushing chamber that empties into the runoff gutter.

To ensure that the flushing torrent will be channeled into the runoff gutter along with the contaminants, one or more curved surfaces can be provided in the runoff area of the liquid-storage space. The curved surface can also be opposed and mutually displaced.

As has already been mentioned herein, the float is preferably positioned in the vicinity of the runoff from the storage space. The motion of the float is transferred to the mechanism that closes off the flushing chamber depending on the level of liquid in the runoff area, by wire cables, Bowden cables, hydraulically, or otherwise for example. It is also conceivable to position the float directly at the closure mechanism and downstream of the flushing opening. In this case the float can act through a lever directly on the cams or hooks to activate the closure flap. In one particular embodiment of the invention, each float is secured along with its arm and with an associated hydraulic cylinder to the wall of the basin. Depending on the level of the liquid, the float exerts tension or pressure by means of its arm on the piston associated with the cylinder. The resulting motion of the piston is transmitted through at least one closed hydraulic line to the piston of another hydraulic cylinder on the closure flap, a piston that for example displaces the shaft with the cams or for example moves a push-pull rod located below the closure flap back and forth inside a bore in the flap, opening or closing the flap depending on the level of the liquid in the runoff area.

Figure 2A:
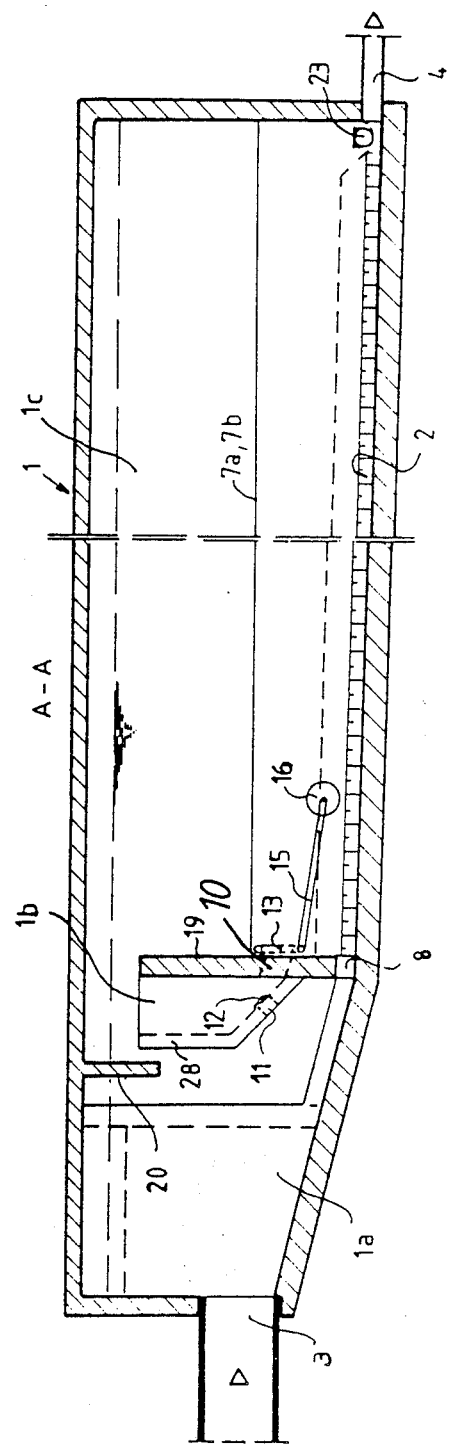
Figure 3:
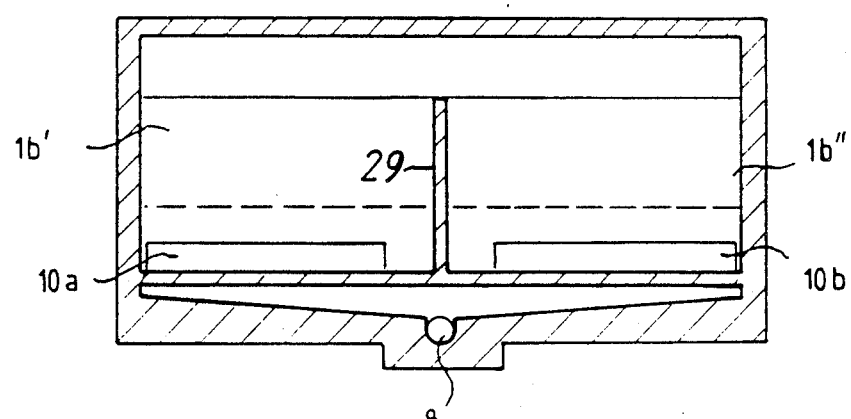
Figure 4:
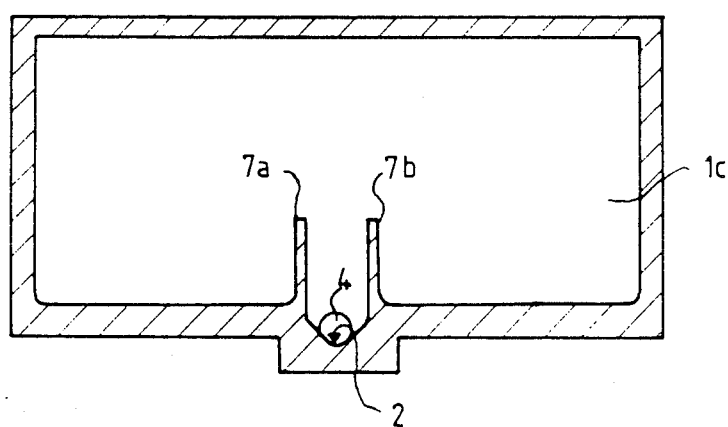
Figure 9:
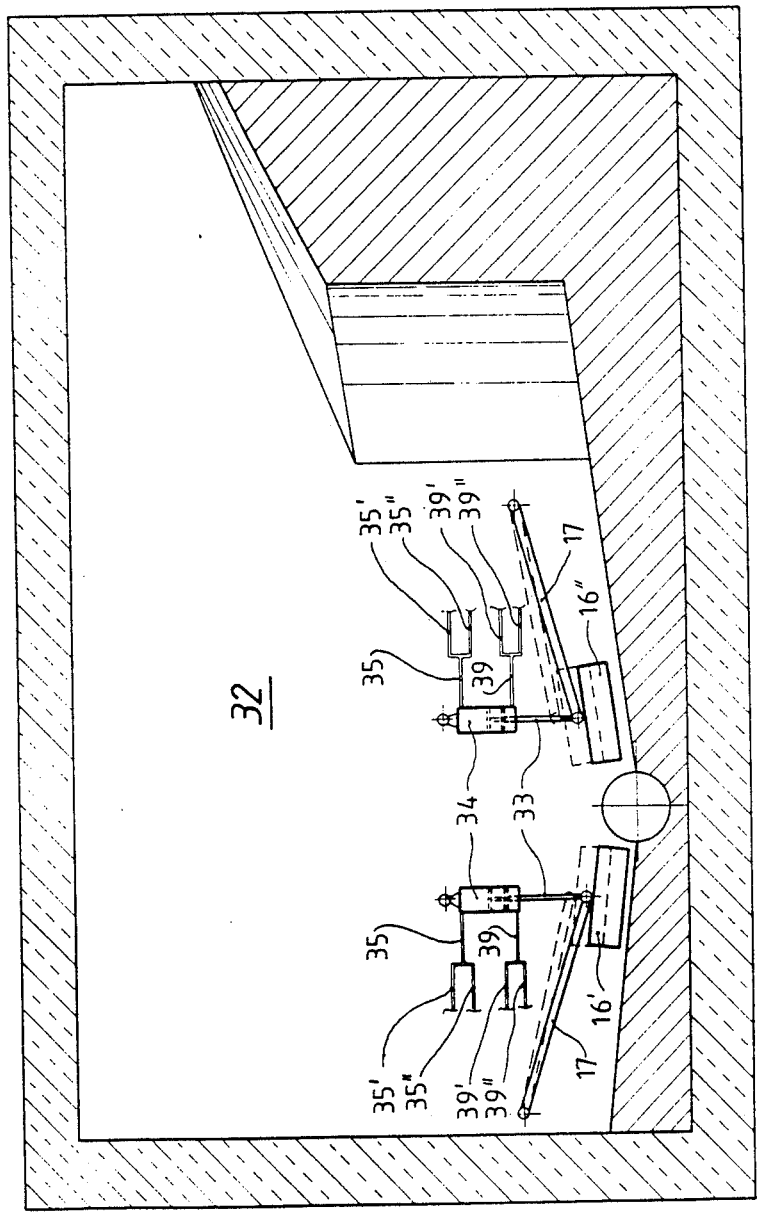
Figure 10:
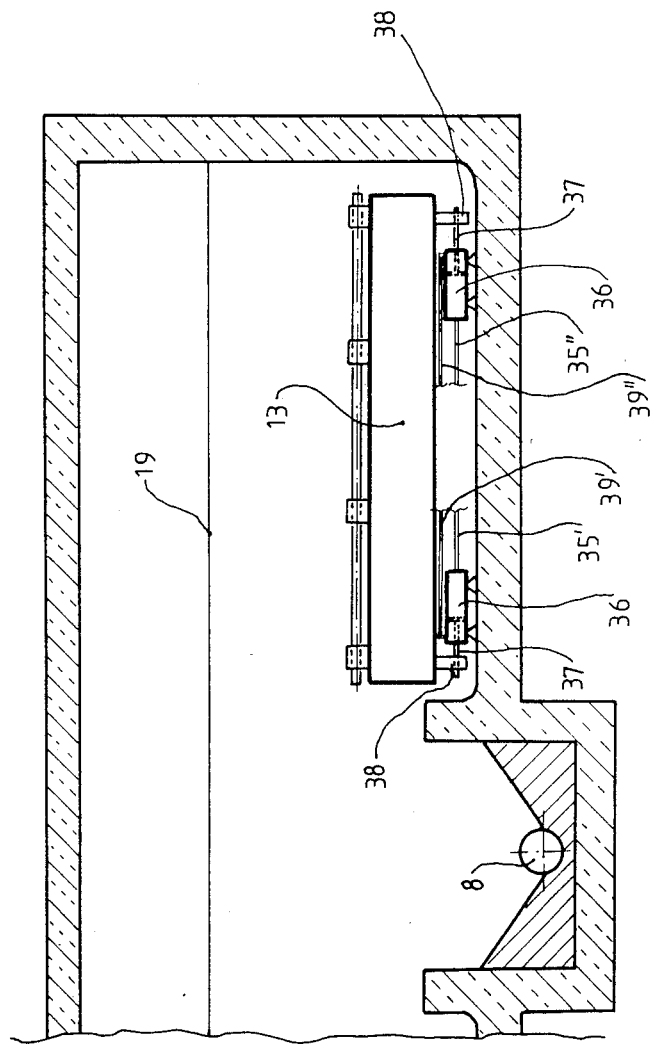
Figure 11:
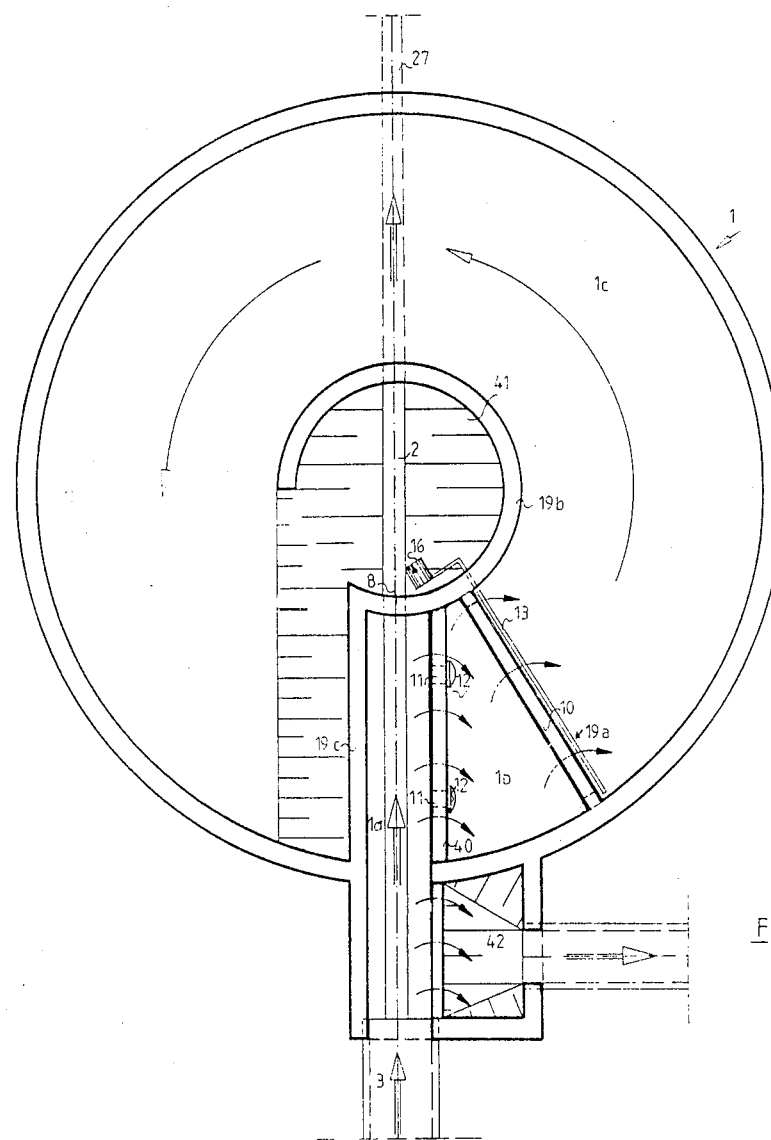
Figure 12:
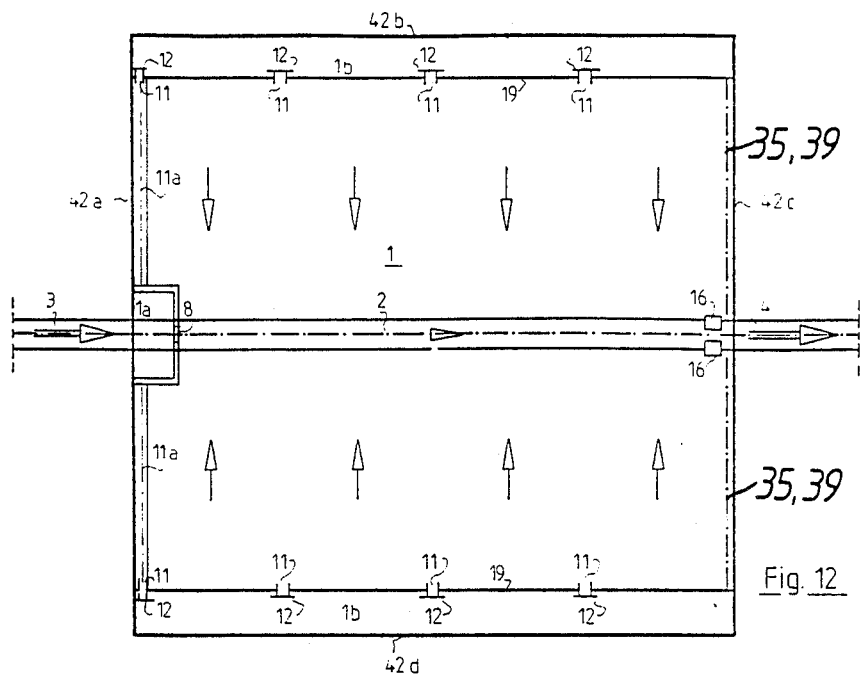
Figure 13:
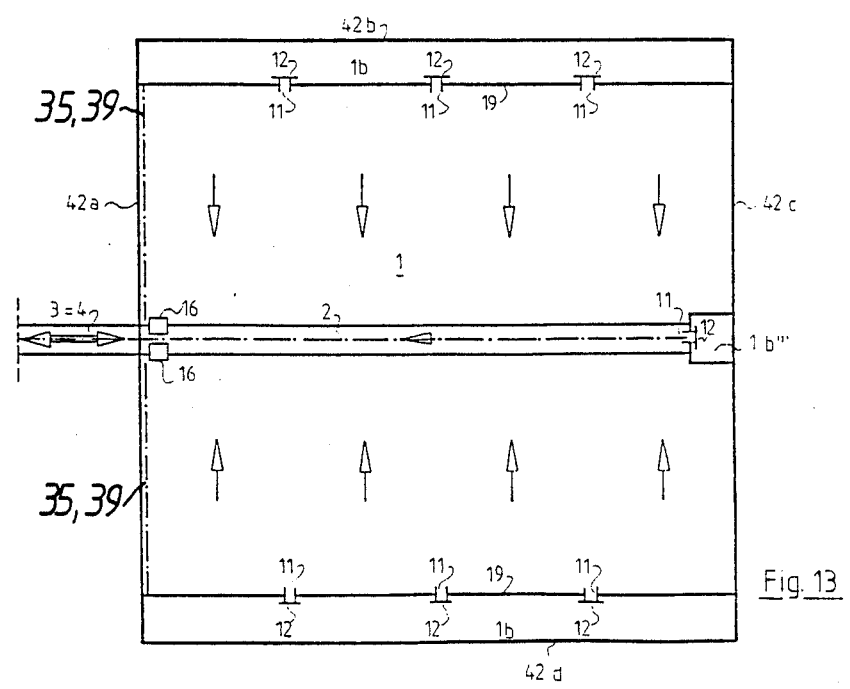

Embodiments of the invention will now be specified by way of example with reference to the drawings, wherein, FIG. 1 is a top view of a rectangular liquid-storage space in accordance with the invention with floats in the vicinity of the flushing openings, FIG. 2a is a section through the liquid-storage space along the line A—A in FIG. 1, FIG. 2b is a variant of the embodiment illustrated in FIG. 2a, FIG. 3 is a section along the line B—B in FIG. 1, with, however, the flushing chambers separated by only one wall, FIG. 4 is a section along the line C—C in FIG. 1, FIG. 5 is a section paralleling the line A—A in FIG. 1 and illustrating the mechanisms that close the flushing chamber, FIGS. 6a and 6b are views of the closure flaps activated by one or two floats, FIG. 7 is a view of a polygonal liquid-storage space in accordance with the invention with floats positioned in the runoff area, FIG. 8 is a section along the line A—A through the liquid-storage space illustrated in FIG. 7, FIG. 9 is a section along the line B—B through the liquid-storage space illustrated in FIG. 7, FIG. 10 is a section along the line D—D through the liquid-storage space illustrated in FIG. 7, FIG. 11 is a top view of a liquid-storage space in accordance with the invention with a circular base, FIGS. 12, 13, and 14 are top views of rectangular basins with different flushing-chamber layouts, whereby FIG. 13 also illustrates an additional flushing chamber 1b for the runoff gutter, and FIG. 15 is top view of a round basin with a special flushing-chamber layout.

To prevent unnecessary repetition, identical parts are labeled with identical reference numbers in the various figures. FIG. 1 illustrates a rectangular rain basin 1 with an intake 3 and an outlet 4. A partition 19 separates the basin into a vestibule 1a and a main chamber 1c. A flushing chamber 1b' is positioned on the right and a flushing chamber 1b" on the left of partition 19. The flushing chambers have a wall 28 toward vestibule 1a. There is a choking opening 8 in partition 19 in the vicinity of the dry-weather gutter. Intake openings 11a and 11b in wall 28 can be closed off with a flap trap 12 (FIGS. 2a & 5). The flaps 13 that close off the flushing opening 10 in the flushing chambers are activated by a float 16 in main chamber 1c. The ratio between the diameter of outlet 4 and that of choking opening 8 is such that a greater volume of liquid can be forced through choking opening 8 than through outlet 4. When a lot of water arrives suddenly, it will get dammed up in vestibule 1a, with water simultaneously accumulating in main chamber 1c, leading to closure of flap 13 due to the stroke of float 16. The water dammed up in vestibule 1a will penetrate into flushing chambers 1b' and 1b" through intake openings 11a and 11b. If the level of liquid drops subsequent to the rainfall, the liquid will be retained by flap trap 12, and flushing chambers 1b' and 1b" will remain full. If main chamber 1c empties, float 16 will descend until closure flaps 13 are released again and flushing will occur. Paralleling dry-weather gutter 2 are two structural sections 7a and 7b that channel the flushing torrent laterally. FIG. 2a is a section along the line A—A in FIG. 1. Partition 19 and wall 28 are in the form of an overflow sill. To prevent ascending contamination from getting into flushing chambers 1b, a downflow baffle 20 that extends from the cover of the basin into vestibule 1a is positioned upstream of wall 28. Channeling sections 7a and 7b have outlet openings in the vicinity of outlet 4 that can be closed off by means of flap traps 23.

FIG. 2b illustrates another embodiment. Wall 28 extends above the maximum liquid level to the cover of rain basin 1 and has slots 21 that slope up toward flushing chambers 1b and provide a downflow-baffle action. The intake opening 11 into every flushing chamber 1b in this embodiment is located above the flushing opening 10 in partition 19.

FIG. 3 is a section along the line B—B in FIG. 1. In contrast to the embodiment illustrated in FIG. 1, flushing chambers 1b' and 1b" extend to the middle of the basin and are separated by only a single wall 29.

FIG. 5 is a detail illustrating the mechanism that closes off the flushing opening 10 in flushing chambers 1b. Closure flap 13 rotates around a shaft 14 positioned above flushing opening 10. The closure mechanism consists of a shaft 17 that rotates inside main chamber 1c and below flushing opening 10. Rigidly attached to shaft 17 are on the one hand a float 16 with a float rod 15 and on the other cams 18. As the level of the liquid rises, float 16 ascends and cams 18 force closure flap 13 against flushing opening 10. Cams 18 and closure flap 15 are mounted on shaft 17 in such a way that the cams release closure flap 13 once the basin has emptied. The pressure of the accumulated water in the corresponding flushing chamber 1b pivots closure flap 13 up (into the position indicated by the broken lines). Choking opening 8 is positioned just below the particular flushing chambers 1b.

FIGS. 6a and 6b are views of the mechanisms that close off the flushing openings 10 in the flushing chamber. A common float 16 is associated with both closure mechanisms in FIG. 6a, whereas the two closure mechanisms in FIG. 6b are each activated by a separate float 16' and 16". By designing the floats differently or by varying the position of cams 18 on shaft 17 it is possible to empty flushing chamber 1b' and 1b" in succession.

FIGS. 7 and 8 are views of a liquid-storage space that is unsymmetrical in relation to dry-weather gutter 2. The side of the space with flushing chamber 1b' is not as long as the side with flushing chamber 1b". The ends of main chamber 1c opposite flushing chamber 1b' and 1b" have curved surfaces 30 and 31, through which the flushing torrent is channeled into dry-weather gutter 2. This embodiment has two floats 16 that are not, however, in contrast to the embodiment just specified, located in the vicinity of closure flaps 13 but on the side of main chamber 1c opposite closure flaps 13 and hence in the outlet area of the main chamber.

FIG. 9 illustrates the precise situation of floats 16' and 16" along with the hydraulic cylinders 34 that operate in conjunction with them. Each float 16' and 16" is secured along with its arm 17 and with its associated hydraulic cylinder 34 to the wall 32 of rain basin 1. Depending on the level of the liquid, float 16' or 16" exerts a push or a pull on the piston rod 33 of the associated hydraulic cylinder 34. If the level of liquid in the main chamber rises, float 16' (and float 16" also of course) will ascend causing the piston associated with hydraulic cylinder 34 to stroke and conveying hydraulic fluid through a line 35, which branches into lines 35' and 35", to two hydraulic cylinders 36 positioned in the vicinity of a closure flap 15. As will be evident from FIG. 10, when hydraulic fluid is conveyed to hydraulic cylinders 36, the piston rod 37 associated with the cylinders will be forced out, passing through two channeling bores 38 on the bottom of closure flap 13. Since each end of piston rod 37 is in a practical way conical, they will readily enter channeling bores 38 when piston rod 37 emerges. When float 16' (and hence float 16" as well) descends, the piston rod 33 on hydraulic cylinder 34 will move down, supplying hydraulic fluid to the opposing operating surface of the pistons associated with hydraulic cylinder 36 through line 39 and branch lines 39' and 39" and accordingly driving piston rod 37 in and initiating the flushing process as closure flap 13. It will be obvious that the system involving float 16" is identical to the system involving float 16'.

FIG. 11 is a top view of a circular basin in which main chamber 1c constitutes an exterior circular-ring segment separated from vestibule 1a by a straight partition section 19a, a circular partition section 19c, and another straight partition section 19c. Vestibule 1a extends from intake 3 to the middle of the basin and is shaped like a keyhole as viewed from above. Flushing chamber 1b is also shaped like a keyhole as viewed from above and is positioned between the partition section 19a and the wall section 40 of vestibule 1a. Vestibule 1a communicates with an annular space 41 inside main chamber 1c. through a choking opening 8. Dry-weather gutter 2 extends along vestibule 1a and through choking opening 8 into inner annular space 41. Wall section 40 has flap traps 12. Partition section 19a has a closure flap 13. Float 16, which activates the mechanism that closes the flushing opening 10 in flushing chamber 1d, is located in inner annular space 41. When rain falls, liquid flows into vestibule 1a and through choking opening 8 into inner annular space 41. The stroke of float 16 leads to the closure of closure flap 13, with liquid simultaneously flowing into flushing chamber 1b through intake openings 11. As more liquid arrives, flushing chamber 1b fills up through intake openings 11 and main chamber 1c through choking opening 8. When more liquid arrives, it either flows from vestibule 1a and over wall section 40 into flushing chamber 1b and thence over partition section 19a into main chamber 1c or leaves rain basin 1 earlier through an overflow 42 in vestibule 1a. The liquid leaves the rain basin through runoff pipe 27.

FIG. 12 shows a rectangular liquid-storage space 1 with walls 42a, 42b, 42c, and 42d and with an intake 3 and an outlet 4 in opposing walls 42a and 42c. The maximum heights of the bottom extend along side walls 42b and 42d, on which flushing chambers 1b are positioned. The runoff gutter or dry-weather gutter 2 extends along the middle of the basin.

Flushing chambers 1b are filled with storage liquid through intake openings 11, which communicate to some extent through pipes 11a or similar structures with a vestibule 1a, which is equipped with a choke 8. Intake openings 11 are not necessary in special cases, in which partition 19 is in the form of an overflow sill and the liquid rushes into flushing chamber 1b from above when rain basin 1 is full. It is also possible to combine intake openings 11 and partition 19 into an overflow sill.

The flushing openings (unillustrated) in flushing chambers 1b are activated by floats 16 by means of a closed hydraulics system 35 and 39. The hydraulic system and floats are designed to open the flaps 15 that close off flushing chambers 1b in sequence once the basin has emptied. This prevents dry-weather gutter 2 from being overloaded by the two flushing torrents.

FIG. 13 shows another embodiment of a rectangular basin 1. The maximum heights of the bottom also extend along side walls 42b and 42d, although intake 3 is identical with outlet 4. Another flushing chamber 16b''', preferably positioned at the highest point of the gutter and also activated by float 16, can be provided to flush the runoff gutter separately. It can also be positioned to flush out only gutter 2. It is also possible to position other flushing-torrent storage chambers 1b on front wall 42c.

FIG. 14 shows an embodiment of a rectangular basin in which the maximum heights of the bottom extend along wall 42a. The flushing chamber 1b positioned on this side wall flushes toward wall 42c. A curved surface 30 channels the flushing torrent directly into gutter 2, from which contaminants are automatically extracted by the constant flow.

The maximum heights of the bottom extend along the periphery of the circular basin 1 illustrated in FIG. 15. The flushing chamber 1b positioned at that location provide a radial flushing action.

We claim:

1. A storage space for liquids, comprising: a rain basin; at least one flushing chamber positioned at a maximum height of the bottom of said storage space and fillable with storage liquid; said flushing chamber emitting storage liquid in form of a torrent of flushing water through at least one flushing opening when said storage space empties; said flushing chamber filling automatically with storage liquid as the level of storage liquid rises; means for retaining storage liquid in said flushing chamber once said storage liquid has arrived in said flushing chamber; closure means controlled by the level of storage liquid in said storage space for closing and opening said flushing opening; said flushing chamber collecting a part of said liquid; said part of liquid being first released through said flushing opening when said storage space has emptied to enable flushing said storage space thoroughly with a strong torrent from the maximum height to the minimum height of the bottom of said storage space to remove sludge deposited in said storage space.

2. A storage space as defined in claim 1, including an intake into the storage space; and at least one choke positioned in vicinity of said intake and between said intake and said storage space.

3. A storage space as defined in claim 1, including intake opening means communicating with said storage space; and a flap trap for closing off said intake opening means.

4. A storage space as defined in claim 1, including means for closing off said flushing opening in said flushing chamber; float means in said storage space for actuating said means for closing off said flushing opening; said storage space having a runoff area, said float means being located in said runoff area and dependent on the level of liquid in said storage space and liquid in said runoff area.

5. A storage space as defined in claim 1, including a vestibule and a wall between said vestibule and said flushing chamber; a wall between said flushing chamber and said storage space; said wall between said vestibule and said flushing chamber and said wall between said flushing chamber and said storage space comprising an overflow sill.

6. A storage space as defined in claim 1, wherein a plurality of flushing chambers are positioned in predetermined arrangements relative to one another.

7. A storage space as defined in claim 1, wherein said flushing chamber is positioned outside of said storage space.

8. A storage space as defined in claim 7, including means for closing off flushing openings and emptying said flushing chambers in predetermined sequence.

9. A storage space as defined in claim 1, wherein said storage space has a runoff gutter extending in a direction that the storage liquid flows out; and parallel structural sections at a side that channel said flushing torrent laterally.

10. A storage space as defined in claim 9, wherein said storage space has transversely sloping bottom with additional channeling sections along the basin to channel said flushing torrent.

11. A storage space as defined in claim 1, including runoff gutter means, said flushing chamber being at the highest point of said gutter means and emptying into said gutter means.

12. A storage space as defined in claim 1, wherein said storage space has a base of predetermined geometrical shape.

13. Storage space as in claim 1, characterized by at least one curved surface (30 or 31) in the runoff area of the storage space and channeling the flushing torrent into a runoff gutter.

14. Storage space as in claim 13, characterized by curved surfaces (30 and 31) opposite each other and mutually displaced in a runoff area.

15. A storage space for liquids, comprising: a rain basin; at least one flushing chamber positioned at a maximum height of the bottom of said storage space and fillable with storage liquid; said flushing chamber emitting storage liquid in form of a torrent of flushing water through at least one flushing opening when said storage space empties; said flushing chamber filling automatically with storage liquid as the level of storage liquid rises; means for retaining storage liquid in said flushing chamber once said storage liquid has arrived in said flushing chamber; closure means controlled by the level of storage liquid in said storage space for closing and opening said flushing opening; said flushing chamber collecting a part of said liquid; said part of liquid being first released through said flushing opening when said storage space has emptied to enable flushing said storage space thoroughly with a strong torrent from the maximum height to the minimum height of the bottom of said storage space to remove sludge deposited in said storage space; means for closing off said flushing opening; float means in said storage space for actuating said means for closing off said flushing opening; a runoff area in said storage space, said float being in said runoff area and located dependent on the level of liquid in said storage space and liquid in said runoff area.

16. A storage space for liquids, comprising: a rain basin; at least one flushing chamber positioned at a maximum height of the bottom of said storage space and fillable with storage liquid; said flushing chamber emitting storage liquid in form of a torrent of flushing water through at least one flushing opening when said storage space empties; said flushing chamber filling automatically with storage liquid as the level of storage liquid rises; means for retaining storage liquid in said flushing chamber once said storage liquid has arrived in said flushing chamber; closure means controlled by the level of storage liquid in said storage space for closing and opening said flushing opening; said flushing chamber collecting a part of said liquid; said part of liquid being first released through said flushing opening when said storage space has emptied to enable flushing said storage space thoroughly with a strong torrent from the maximum height to the minimum height of the bottom of said storage space to remove sludge deposited in said storage space; intake means into said storage space; at least one choke positioned in vicinity of said intake means and between said intake means and said storage space; intake opening means communicating with said storage space; means for closing off said intake opening means and comprising a flap trap; means for closing off said flushing opening in said flushing chamber; float means in said storage space for actuating said means for closing off said flushing opening in said flushing chamber, said float means being located in a runoff area of said storage space and dependent on the level of liquid in said storage space and liquid in said runoff area; a vestibule and a first wall between said vestibule and said flushing chamber; a second wall between said flushing chamber and said storage space, said first wall and said second wall comprising an overflow sill; said storage space having runoff gutter means extending in a direction that the storage liquid flows out, and parallel structural sections at a side that channel said flushing torrent laterally; said flushing chamber being at the highest point of said gutter means and emptying into said gutter means; said storage space having transversely sloping bottom with additional channeling sections along the basin to channel the flushing torrent; said storage space having a base of predetermined geometrical shape.

* * * * *